United States Patent
Osman et al.

(12) 
(10) Patent No.: US 6,957,729 B2
(45) Date of Patent: *Oct. 25, 2005

(54) FRICTION CLUTCH, FOR MOTOR VEHICLE, EQUIPPED WITH A MONITORED PLAY COMPENSATION DEVICE

(75) Inventors: Hafiz Osman, Villeneuve d'Ascq (FR); Gilles Payraudeau, Saint Vast En Chaussee (FR); Eric Marie, Villiers Bretonneux (FR); Yves Saint Martin, Camon (FR)

(73) Assignee: Valeo Embrayages, Amiens (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/466,910

(22) PCT Filed: Oct. 2, 2002

(86) PCT No.: PCT/FR02/03348

§ 371 (c)(1),
(2), (4) Date: Dec. 15, 2003

(87) PCT Pub. No.: WO03/036116

PCT Pub. Date: May 1, 2003

(65) Prior Publication Data

US 2004/0079607 A1 Apr. 29, 2004

(30) Foreign Application Priority Data

Oct. 23, 2001 (FR) .................................... 01 13701

(51) Int. Cl.$^7$ ............................................. F16D 13/75
(52) U.S. Cl. ................................ 192/70.25; 192/111 A
(58) Field of Search .......................... 192/70.25, 111 A

(56) References Cited

U.S. PATENT DOCUMENTS

| 5,469,760 A | 11/1995 | Kamio |
| 5,641,048 A | 6/1997 | von Gaisberg |
| 6,779,643 B2 * | 8/2004 | Doremus et al. ........ 192/70.25 |
| 2003/0141163 A1 * | 7/2003 | Doremus et al. ........ 192/70.25 |

FOREIGN PATENT DOCUMENTS

WO    WO 01/88400 A1    11/2001

* cited by examiner

Primary Examiner—Rodney H. Bonck
(74) Attorney, Agent, or Firm—Berenato, White & Stavish

(57) ABSTRACT

A heat engine motor vehicle, having a reaction plate, a friction disc, a pressure plate, a cover, the pressure plate being two half-plates, axially mobile relative to each other, under the action of device compensating play resulting from wear which comprises a pair of complementary ramps circumferentially arranged axially associated respectively with each of the two half-plates one of the ramps being designed to move circumferentially relative to the other ramp in the direction increasing the thickness of the pressure plate, and prevented from moving in the other direction by a one-way mechanism, one of the ramps being arranged at the periphery of an inertial part. A monitoring mechanism, is provided to control the wear compensation device.

19 Claims, 6 Drawing Sheets

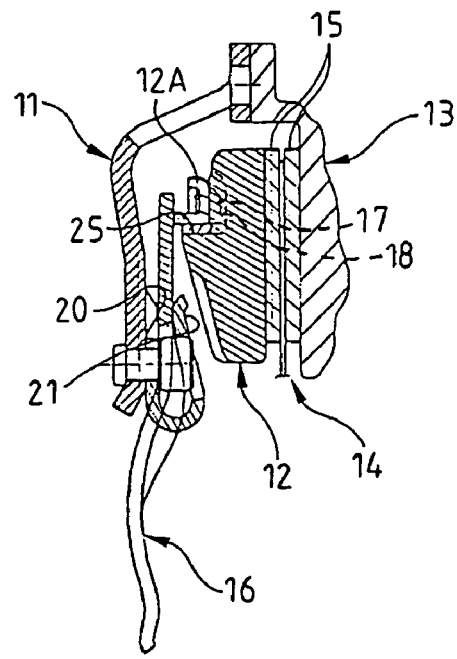
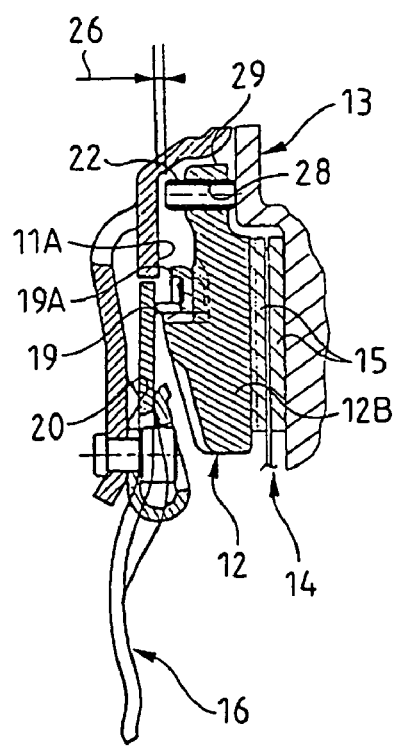
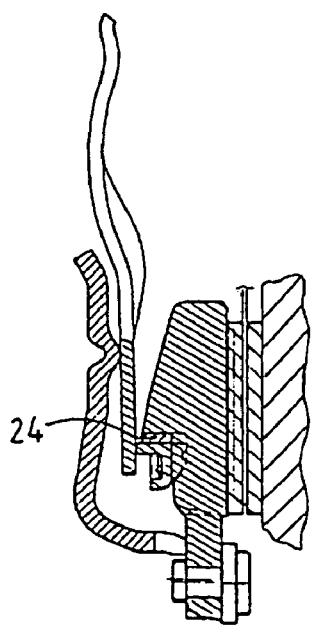
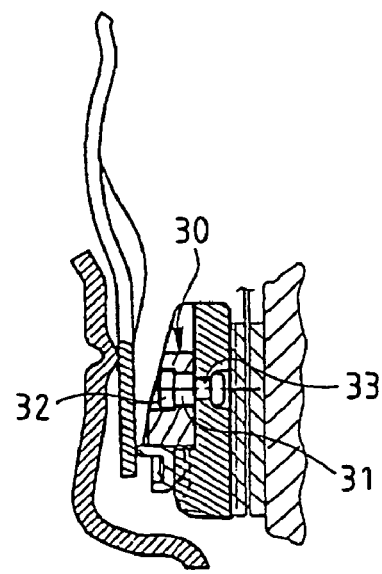
Fig.2　　　　　　　　　　Fig.3

FRICTION CLUTCH, FOR MOTOR VEHICLE, EQUIPPED WITH A MONITORED PLAY COMPENSATION DEVICE

The present invention concerns a friction clutch, for a motor vehicle with a heat engine, and relates more particularly to a clutch equipped with a device for compensating for the play due principally to the wear of the friction linings, said device working continuously as said linings wear.

A conventional friction clutch generally comprises a reaction plate, possibly in two parts for forming a damping flywheel, clamped rotation-wise on a first shaft, usually a drive shaft such as the crankshaft of the internal combustion engine, and supporting by its external periphery a cover to which at least one pressure plate is attached.

The pressure plate is fixed rotation-wise to the cover and to the reaction plate while being able to move axially under the action of controlled axially-acting elastic means, generally a metal diaphragm resting on the cover, whilst a friction disc, carrying friction linings at its external periphery, fixed rotation-wise to a shaft, usually a driven shaft such as the input shaft of the gearbox, is inserted between the pressure plate and the reaction plate so as to be gripped between them when the clutch is in the engaged position. The diaphragm controls the axial movement of the pressure plate when it is actuated by a clutch release bearing.

During the service life of such a clutch, the friction linings and, to a lesser extent, the counter-materials, the pressure plate and reaction plate, wear, which causes a variation in the gripping force between the friction disc, on the one hand, and the pressure and reaction plates, on the other hand, owing to the changes in the working conditions of the diaphragm.

The clutch travel also varies, as does the force necessary for disengaging the clutch. By providing such a clutch with a device for compensating for the play due principally to the wear of the linings, these drawbacks are avoided.

There is known through the document FR 2 426 834 a play compensation device in which a first plate, in this case the pressure plate, is made of two coaxial parts movable axially with respect to one another so that the total thickness of the first plate increases as the wear increases.

In this document, the two coaxial parts of the first plate are movable axially with respect to one another by virtue of a compensation device which comprises ramp means carried in a complementary manner by the two coaxial parts which are moreover movable rotation-wise with respect to one another in the direction of increasing said total thickness and prevented from turning with respect to one another in the direction opposite to the preceding one by a unidirectional means. The setting into relative rotational motion of the coaxial parts is controlled by a trigger device sensitive to the wear state and implemented by a circumferentially-acting elastic means coupled between said two coaxial parts.

Such a device effectively makes it possible to continuously compensate for the play due to the wear of the friction linings.

There has also been proposed, in particular in the document FR-A-2 750 467, a clutch of the above kind which is simpler to implement, having a smaller number of pieces.

According to this document, a friction clutch, in particular for a motor vehicle, of the kind comprising a reaction plate intended to be clamped rotation-wise on a drive shaft, a friction disc, carrying friction linings at its external periphery, intended to be clamped rotation-wise on a driven shaft, a pressure plate, a cover fixed on the reaction plate, axially-acting elastic means acting between the cover and the pressure plate, the pressure plate being fixed rotation-wise to the cover while being able to move axially with respect thereto, one of the two plates, reaction plate or pressure plate, referred to as the first plate, consisting of two half-plates, a so-called external half-plate and a so-called internal half-plate, the internal half-plate being the one which faces a friction lining and which is intended to cooperate therewith, the two half-plates being fixed rotation-wise to the drive shaft but movable axially, with respect to one another, under the action of a device for compensating for the play due to the wear principally of the friction linings, said play compensation device comprising at least one pair of circumferentially disposed complementary ramps associated respectively with each of the two half-plates, one of the ramps, referred to as the support ramp, being fixed rotation-wise to one of the half-plates, the other ramp, referred to as the adjustment ramp, being fixed to the other half-plate and adapted to move circumferentially with respect to the support ramp, in the direction of increasing the total thickness of said first plate, referred to as the compensation direction, and prevented from moving in the other direction by a so-called unidirectional means, said circumferential movement being controlled by a trigger device sensitive to the wear state.

According to this document, the adjustment ramp is formed at the periphery of an inertia piece, so that the irregular rotation speed of the motor vehicle heat engine is utilised in order to make the complementary ramps perform their relative circumferential movement in the play compensation direction. In fact, as is known, the irregular rotation speed results in varying angular accelerations which can reach more or less two thousand radians per second squared; by virtue of the inertia piece subjected to these angular accelerations, when the clutch is disengaged and, consequently, the two half-plates are no longer under the axial effort of the axially-acting elastic means, the adjustment ramp turns in the compensation direction with respect to the support ramp, since the unidirectional means prevents it from turning in the other direction. Thus, it is not necessary to provide a circumferentially-acting elastic means between the two so-called coaxial parts and use is made of the irregular rotation speed.

As may also be seen, the operation of the play compensation device is automatic. Experience has shown that there can be cases where this automatic functioning is a drawback since it leads to a compensation operation not related to wear, a so-called over-compensation operation.

This is the case for example at very low speed, below the idling speed, and in particular when the reaction plate, or flywheel, is a dual damping flywheel whose own vibration frequency is situated in this range of low speeds and produces vibrations leading to the external half-plate moving and compensating for a "play" which does not exist.

Other spurious phenomena can occur at higher speeds, for example above two thousand revolutions per minute.

In order to avoid these drawbacks, there was proposed in the French patent application filed on 19 May 2000, under number 00 06480, a friction clutch for a motor vehicle with a heat engine, of the kind comprising a reaction plate intended to be clamped rotation-wise on a drive shaft, a friction disc, carrying friction linings at its external periphery, intended to be clamped rotation-wise on a driven shaft, a pressure plate, a cover fixed on the reaction plate, axially-acting elastic means acting between the cover and the pressure plate, the pressure plate being fixed rotation-wise to the cover while being able to move axially with respect thereto, one of the pieces, reaction plate or pressure plate or cover, consisting of two half-pieces, movable axially, with respect to one another, under the action of a device for compensating for the play due to wear, said play compensation device comprising at least one pair of circumferentially disposed complementary ramps associated axially respectively with each of the two half-pieces, one of the ramps being adapted to move circumferentially with respect to the other ramp in the direction of increasing the total thickness of said piece, referred to as the compensation direction, and prevented from moving in the other direction by a so-called unidirectional means, said circumferential movement being controlled by a trigger device sensitive to the wear state, one of the ramps being formed at the periphery of an inertia piece, so that the irregular rotation speed of the motor vehicle heat engine is utilised in order to make the complementary ramps perform their relative circumferential movement in the play compensation direction, said clutch comprising control means adapted to control the play compensation device by enabling, or not, its operation.

According to FIGS. 39 and 40 of this document, the unidirectional means is a split segment and the control means comprise a lever disposed radially overall, the end of which is between the ends of the split ring and which is adapted to expand the split segment.

In the embodiment described and depicted, the internal end of the lever is in a notch in the half-plate which is thus adapted to move this end in one direction or in the other when it is subjected to an acceleration in one direction or in the other, generating locking in the two directions.

Such a clutch works well; however, in certain cases, the lever, which is not positively stopped radially, is caused, under the action of centrifugal force, to interfere with the control of the play compensation device.

The aim of the present invention is to remedy these drawbacks.

According to the invention, a friction clutch of the above type is characterised by the fact that the lever is mounted able to rotate on said piece so that it is held radially with regard to the centrifugal force.

Advantageously, said piece is one of the two plates, reaction plate or pressure plate, referred to as the first plate, consisting of two half-plates, one so-called external half-plate, and one so-called internal half-plate, the internal half-plate being the one which faces a friction lining and which is intended to-cooperate therewith, the two half-plates being fixed rotation-wise to the drive shaft but movable axially, with respect to one another, under the action of the play compensation device, one of the ramps, referred to as the support ramp, being fixed rotation-wise to one of the half-plates, the other ramp, referred to as the adjustment ramp, being adapted to move circumferentially with respect to the support ramp in the direction of increasing the total thickness of said first plate.

Preferably, the support ramp is carried by the internal half-plate.

Advantageously, the adjustment ramp is carried by the external half-plate.

According to a preferred embodiment, the first plate is pressure plate.

Advantageously, the axially-acting elastic means consist of a diaphragm, and the external half-plate is provided with a support bead for the diaphragm.

The adjustment ramp comprises a series of ramps extending circumferentially at the end of an annular piece made of cu' and folded sheet metal constituting the external half-plate.

Preferably, the lever comprises a so-called active part disposed in line with the split in the split segment.

Advantageously, the ends of the split segment which define its split have a radial extension.

Preferably, the radial extension is obtained by tabs added on to the ends of the segment.

In a variant, the radial extension is obtained by a looped conformation of the ends of the segment.

Preferably, the segment is made in a single piece.

In a variant, the segment is made from two seamed pieces.

Advantageously, the split segment is held axially.

Preferably, the split segment is held axially by radial barbs, which it carries internally, received in an external groove or slot.

Preferably, the split segment is acted on elastically circumferentially in one direction of rotation.

Advantageously, the rotation means is a spindle; in a variant, the rotation means is an articulation.

Advantageously, for axially holding the lever, its active part is received in radial slots formed at the ends of the segment.

Other characteristics and advantages of the invention will emerge moreover from the description which follows, by way of example, with reference to the accompanying drawings in which:

FIGS. 2 and 3 are sectional views along II—II and III—III of FIG. 1, respectively;

Figure 7:
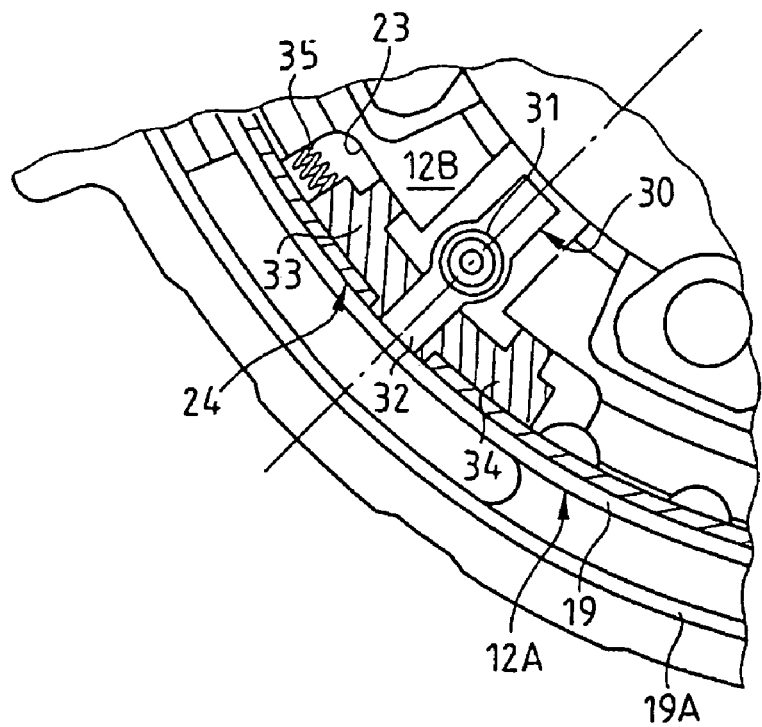
FIG. 7 is a partial view of FIG. 1 on a larger scale.
Figure 9:
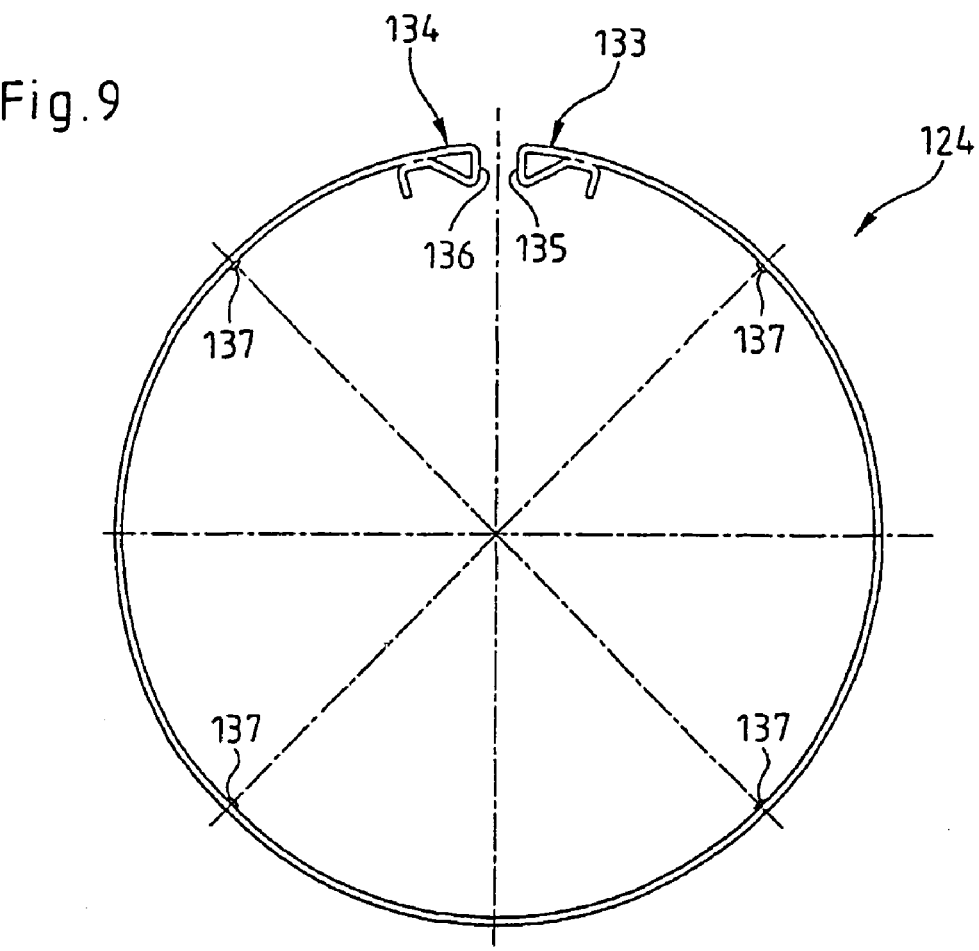
Figure 10:
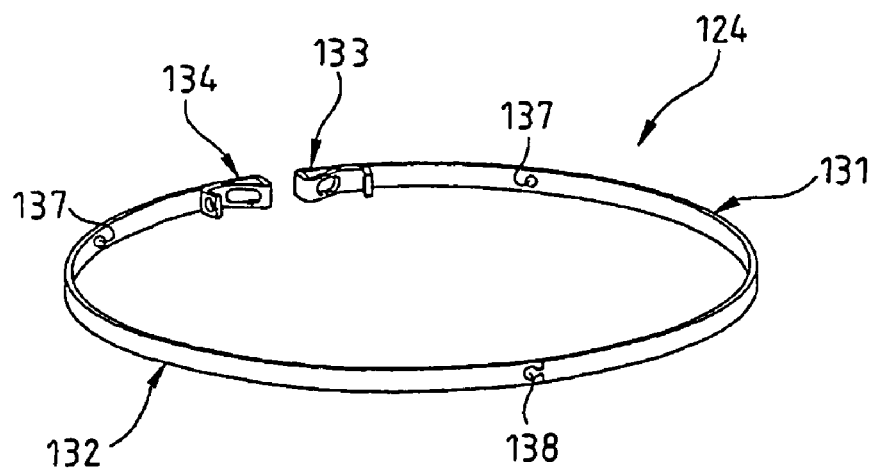
Figure 11:
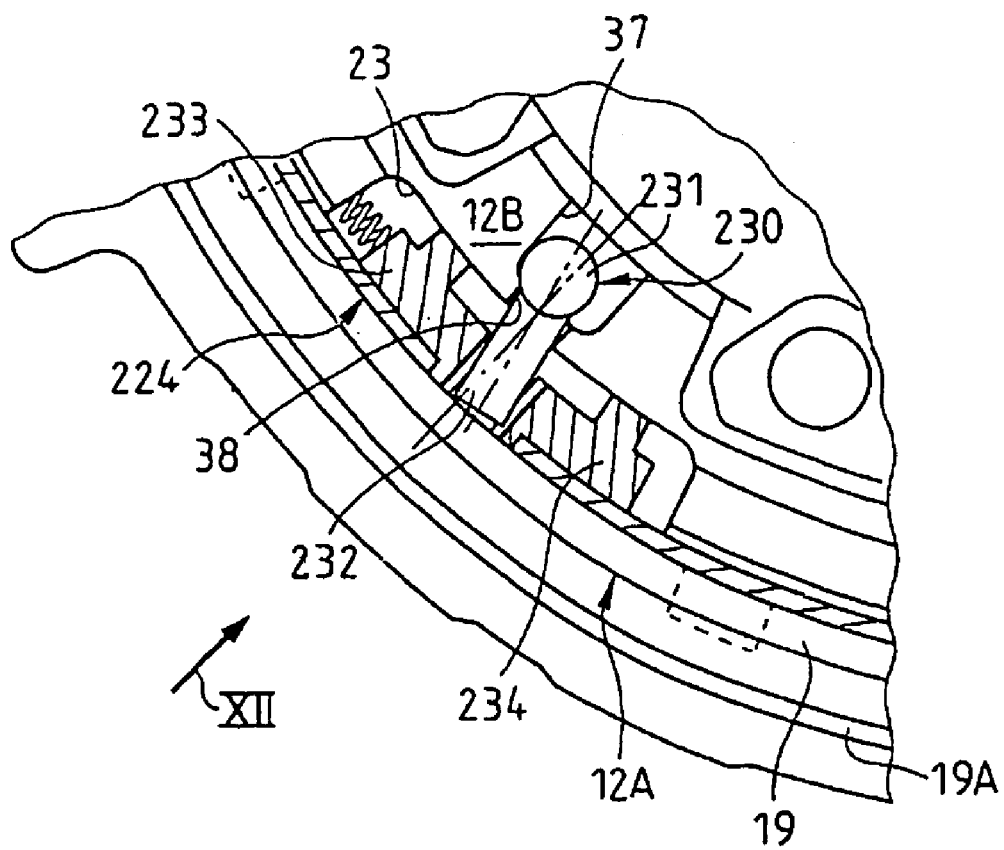
Figure 12:
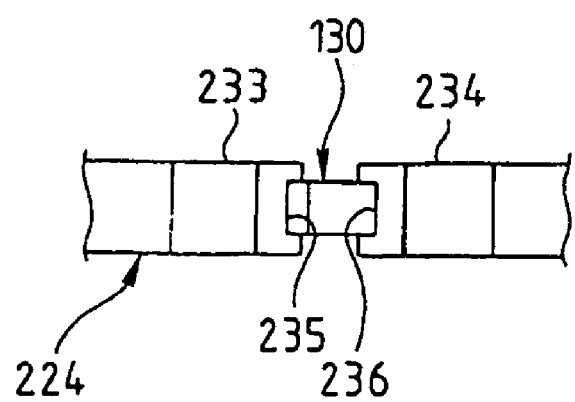

FIG. 9 relates to a split ring variant;

FIG. 10 relates to yet another split ring variant;

FIG. 11 is a view analogous to FIG. 7 and shows a variant;

FIG. 12 is a view along arrow XII of FIG. 11.

Referring to FIGS. 1 to 7, it can be seen that the clutch comprises a reaction plate 13 intended to be clamped rotation-wise on a drive shaft, here the crankshaft of the a motor vehicle heat engine, a friction disc 14 carrying friction linings 15 at its external periphery and intended to be clamped rotation-wise on a driven shaft.

A cover 11 is fixed on the reaction plate 13 and axially-acting elastic means, here a diaphragm 16, act between the cover 11 and a pressure plate 12 fixed rotation-wise to the cover 11 and a pressure plate 12 fixed rotation-wise to the cover 11 but able to move axially with respect thereto, the diaphragm 16 applying, by resting on the cover 11, the pressure plate 12 against the friction disc 14 so that the friction linings 15 are gripped between the pressure plate 12 and reaction plate 13; as known per se, the diaphragm 16 is mounted so as to be articulated on the cover 11 by fastenings 21 riveted thereon and rests on the cover according to a circumferential reach 20 which it has.

The pressure plate 12 consists of two half-plates; a half-plate 12A referred to as the external half-plate, and a half-plate 12B, referred to as the internal half-plate, which directly faces the friction disc 14; tangential tongues conventionally connect the internal half-plate 12B to the cover 11, for connecting, with axial mobility, the pressure plate 12 with the cover 11.

The two half-plates 12A, 12B are fixed rotation-wise to the drive shaft but movable axially, with respect to one another, under the action of a device for compensating for play due to wear.

The play compensation device comprises complementary ramps 17, 18 disposed circumferentially and associated respectively with each of the two half-plates 12A, 12B.

More precisely, the external half-plate 12A is an annular piece housed in line with a step 25 in the internal half-plate 12B; the axial length of the annular piece 12A is greater than the axial height of the step 25 and its end which faces the cover 11 is shaped as a support bead 19 for the diaphragm 16.

On its face turned towards the half-plate 12B, the annular piece 12A carries ramps 18, the axis of which is the axis of the clutch and which constitute the adjustment ramp.

By means of its ramps 18, the annular piece 12A constituting the external half-plate cooperates with ramps 17, complementary to the ramps 18, implemented in the internal half-plate 12B and constituting the support ramp.

A split segment 24 surrounds the step 25, being disposed radially between said step 25 and the half-plate 12A. Here, the segment 24 is a single piece, of overall annular shape.

The direction of the support 17 and adjustment 18 ramps is such that, when the half-plate 12A is subjected to an acceleration in one direction, the adjustment ramp 18 moves rotation-wise with respect to the support ramp 17 and the half-plate 12A and, during this movement, moves forward axially with respect to the internal half-plate 12B in the direction of the cover 11, said direction having been chosen accordingly; thus, the irregular rotation speed of the heat engine is sufficient to make the external half-plate 12A come out axially with respect to the step 25 if, of course, nothing opposes this coming out, as explained below.

The play compensation device also comprises a trigger device consisting of at least one radially expanding elastic split pin 22 introduced into a passage 28 through which it passes formed in a radial end lug 29 of the internal half-plate 12B; the diameter of the passage 28 is less than the external diameter of the pin 22 in the free state so that said pin is mounted with friction in the passage 28 and immobilised axially with respect to the internal half-plate 12B; this immobilisation friction is provided with a value such that it can be overcome by the axial effort due to the diaphragm 16 and it cannot be overcome by the return effort to which the pressure plate 12 is subjected, a return effort such as that generally coming from the tangential tongues coupling rotation-wise said pressure plate 12, here the half-plate 12B, and the cover 11.

Advantageously, three pins such as the pin 22 are provided, introduced into three passages 28 formed in three lugs 29 of the internal half-plate 12B.

The operation of the play compensation device according to the invention is as follows.

FIGS. 2 and 3 depict the engaged clutch, the friction linings 15 being new and gripped between the pressure plate 12 and the reaction plate 13.

In this position, one end of the pins 22 is abutting on the internal face of the reaction plate 13, and the external half-plate 12A is in the in position, axially with respect to the step 25 of the internal half-plate 12B.

When the clutch is disengaged, the diaphragm 16 has changed to its end of disengagement travel position; the support bead 19 is no longer in contact with the diaphragm 16; the other end of the pin 22 is in contact with the cover 11, here the internal face of the radial lug emerging from the cover 11; thus, the pin 22 is mounted between this internal face and that of the reaction plate 13 with an axial play 26 which illustrates the axial travel of the pressure plate 12 during disengagement of the clutch.

When there is wear, in particular of the friction linings 15, the pressure plate 12 gets closer to the reaction plate 13, the clutch being engaged; during this movement, the pin 22 being held axially by its abutment on the reaction plate 13, the lug 29 of the internal half-plate 12B slides over the pin 22 as a result of the axial effort of the diaphragm 16.

At disengaging of the clutch after wear, first the pin 22 has come into abutment on the cover 11, then the diaphragm has continued its travel and has lifted off the support bead 19; the internal half-plate 12B having drawn back only by an amount equal to the play 26, the shoulder 19A of the support bead 19 is at a distance from the cover limit stop 11A corresponding to the wear measured axially; subsequently, the external half-plate 12A, which is no longer subject to the action of the diaphragm, is free to move in the direction of the diaphragm 16, by virtue of the accelerations to which it is subjected as a result of the irregular rotation speed of the engine, as explained above; the external half-plate 12A continues to come out until the shoulder 19A of the support bead 19 comes into abutment on the cover limit stop 11A: thus, the play due to wear has been compensated for.

When the play due to wear has been compensated for, and the clutch is once again engaged, the working position of the diaphragm 16 is identical to that which it had at the beginning, in the new state.

Figure 1:
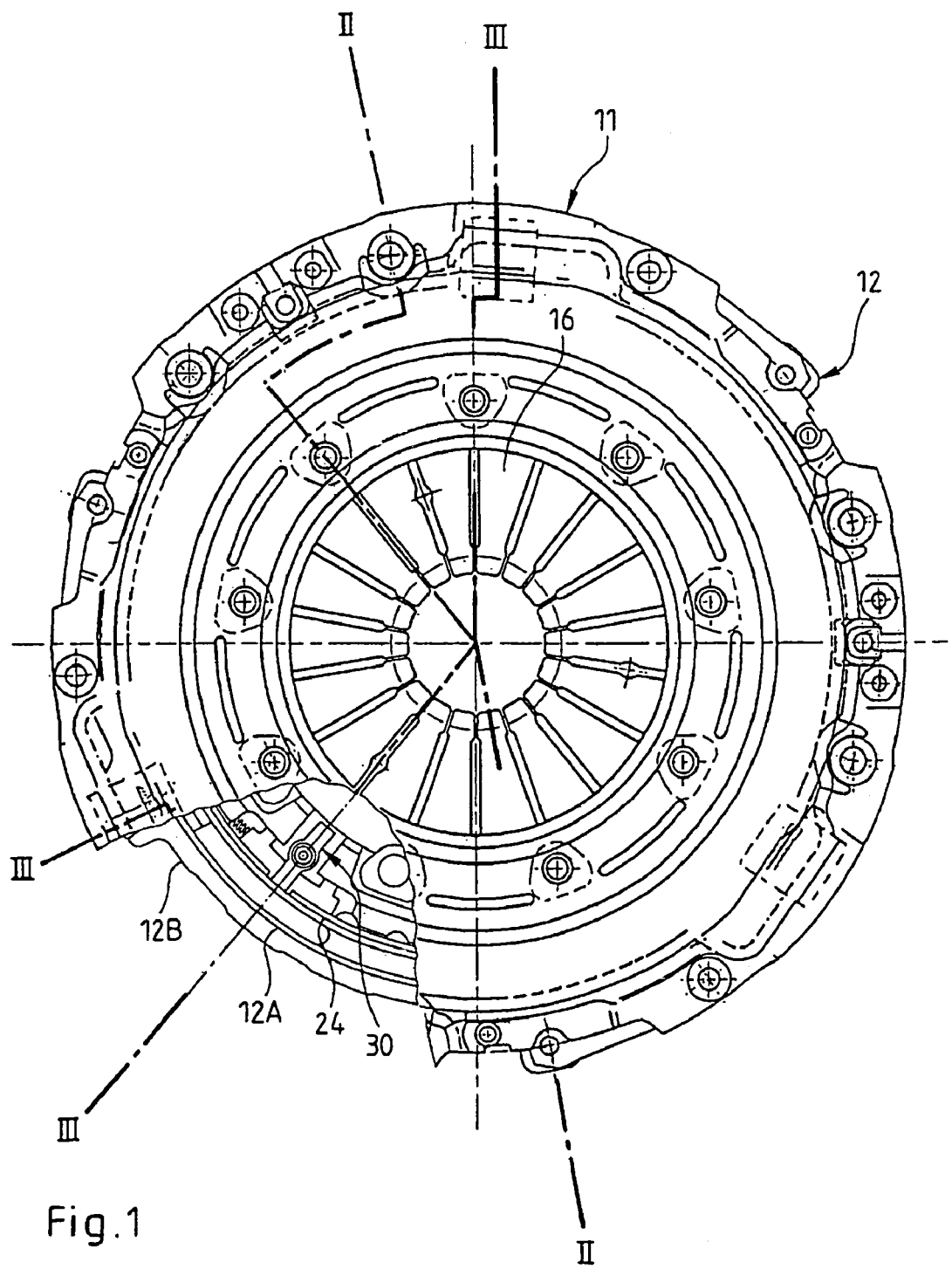
FIG. 1 is a partial plan view of a friction clutch according to the invention.
Figures 4, 5:
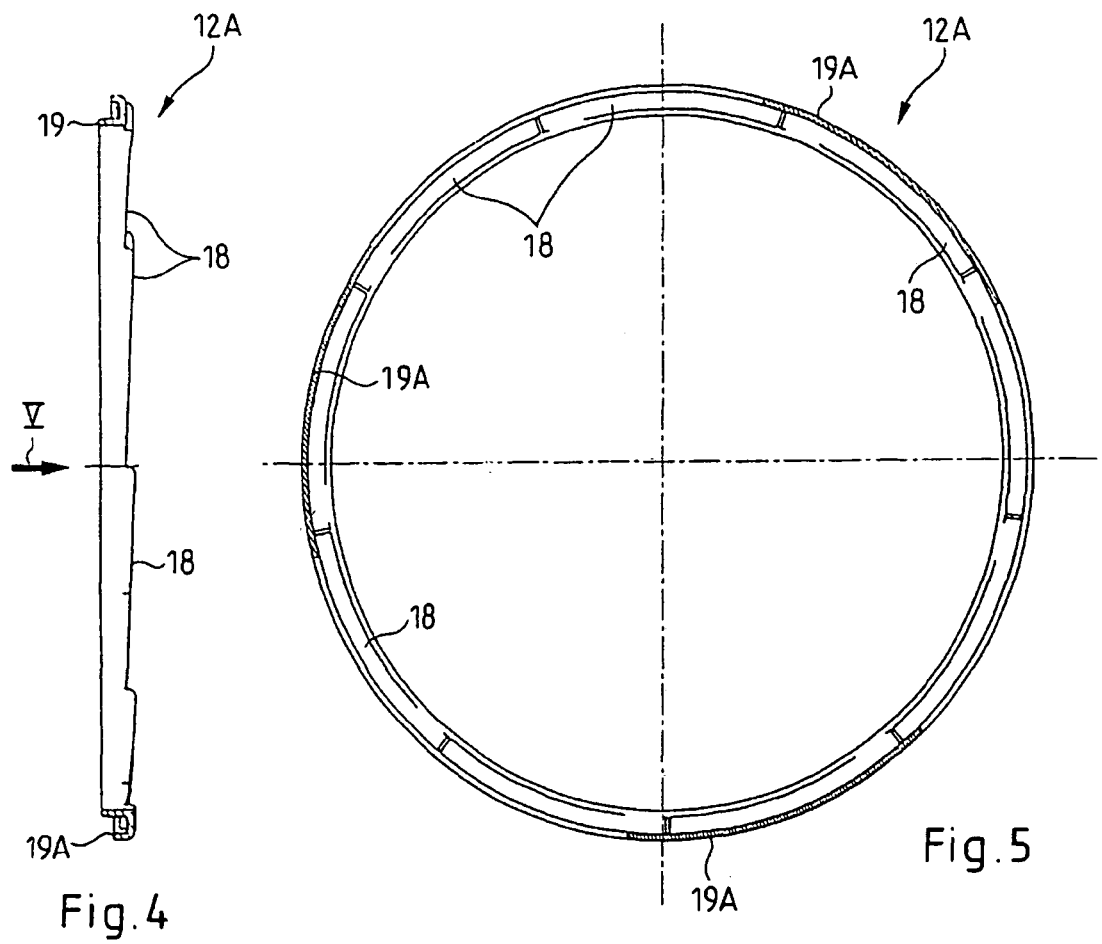
FIG. 4 is an axial sectional view of the external half-plate of the clutch of FIG. 1.
FIG. 5 is a view along arrow V of FIG. 4.
Figure 6:
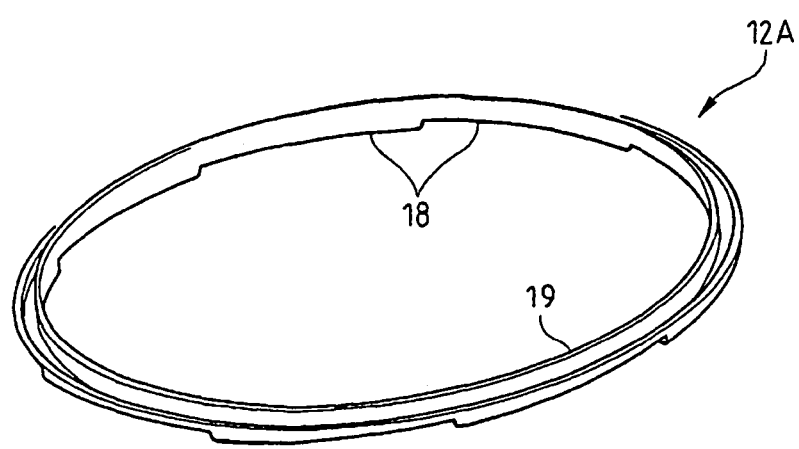
FIG. 6 is a perspective view of the half-plate of FIGS. 4 and 5.

In the embodiment depicted in FIG. 1, the control means comprise a lever 30 mounted able to rotate about a rotation means carried here by the internal half-plate 12B; in the embodiment depicted, the rotation means is a spindle 31 provided, on the one hand, with a head 32 axially holding said lever 30 and, on the other hand, a tail 33 by which it is secured to said half-plate 12B, for example by riveting The part of the lever 30 which extends radially externally beyond the spindle 31 is disposed in line with the split in the split segment 24; in order that this part, referred to as the active part 32 of the lever 30, can be caused to expand said segment 24, under certain conditions, the ends of the split segment 24, which define its split, have a notable radial extension, much greater than the radial thickness of the remainder of the body of the segment 24; here, this radial extension is obtained by tabs 33, 34 added on to the ends of the segment 24, for example by welding or overmoulding.

The tabs 33, 34 are disposed in an indentation 23 in the internal half-plate 12B.

Figure 8:
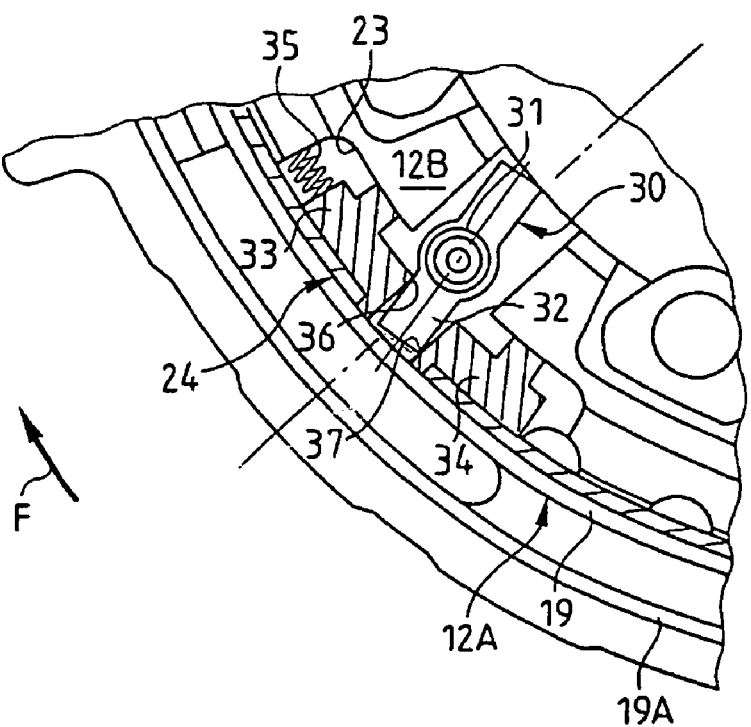
FIG. 8 is a schematic view illustrating the operation of the control means of the clutch of FIGS. 1 to 7.

At rest, the lever 30 is pushed by the spring 35 into the position shown in FIG. 8.

During a so-called negative acceleration applied to the plate 12B in the clockwise direction, namely the direction designated by the arrow F in FIG. 8, the split segment 24 and its tabs 33, 34 tend to be moved relatively in the opposite direction as a result of their own inertia; during this acceleration, the active part 32 of the lever 30, in contact at 36 on the tab 33 and at 37 on the tab 34, the two points 36 and 37 being on different radii, expands by lever effect the split segment 24 which is then gripped circumferentially against the half-plate 12A and makes this fixed to the half-plate 12B, thus preventing any compensation.

For an acceleration in the other direction, an analogous phenomenon would be obtained but a dissymmetrical operation is introduced.

In order to do this, a spring 35 is disposed in the indentation 23 and is adapted to act on the segment 24 by means of one of the tabs, here the tab 33, in one direction of rotation, here the anticlockwise direction.

Thus, for an acceleration according to F, the segment 24 is easily expanded and the adjustment ramps 18 are immobilized with respect to the pressure plate 12. The same applies for an acceleration in the other direction if it is insufficient to overcome the load of the spring 35.

For an acceleration in the direction opposite to F sufficient to overcome the load of the spring 35, the segment 24 closes up and the adjustment ramps 18 are free: a compensation operation is possible.

Of course, for an acceleration much greater than the load of the spring 35, the operation described initially applies, that is to say the split segment 24 is expanded and the adjustment ramps 18 are locked relative to the pressure plate 12.

Thus, by virtue of the spring 35, an oscillation of the lever 30 is avoided as it were between its two positions of locking of the ramps 18 by the expansion of the split segment 24.

By suitably calibrating the spring 35, it can be arranged so that, in the range of ordinary accelerations, the split segment 24 is just slackened, that is to say not expanded, but no more.

By virtue of the spring 35, an over-compensation is avoided for example during the starting of an engine equipped with a dual damping flywheel, which, as is known, for a speed below the idling speed, is subject to resonance phenomena leading to high accelerations.

The calibration of the spring 35 must of course take into account the gearing down effect due to the driving of the split segment 24 by the active part 32 of the lever 30, while said active part moves apart the edges of the split in the segment 24; this gearing down effect leads to a small expansion of the segment 24, in view of its circumferential movement, and therefore to a large effort.

In the example which has just been described, the ends of the segment 24 which edge its split have a sufficient radial height obtained by adding on tabs 33, 34 for cooperation with the active part 32 of the lever 30.

This sufficient height can be obtained otherwise, for example by shaping in an appropriate manner the ends of the segment itself.

One example is shown in FIG. 9; here, the ends of a segment 124 have been folded back to form loops 133, 134 having parallel straight parts 135, 136 defining the split in the split segment 124.

In the embodiment depicted, the split segment 124 carries internally radial barbs 137, here four barbs 137, intended to be received in an external groove or slot in the half-plate 12B with a view to its being held axially.

The segment shown in FIG. 10 is similar to the segment of FIG. 9 except that here it is made of two parts 131, seamed at 138.

FIGS. 11 and 12 show a variant of the control means in the form of a lever.

Here, the bottom of the indentation 23 communicates by a radial channel 38 with an opposite indentation 37, the bottom of which constitutes a seat for a tail 231 of a lever 230, the active part 232 of which, emerging from the tail 231, is here of parallelepipedal shape and passes through the radial channel 38; advantageously, the tail 231 cooperates with said seat according to a cylindrical or spherical reach, said seat being able to have a shape complementary to that of this reach. For retaining it axially, the active part 232 of the lever 230 is received in slots 235, 236 formed at the end of the parts 233, 234 of the segment 224.

What is claimed is:

1. Friction clutch for a motor vehicle with a heat engine, comprising a reaction plate (13) intended to be clamped rotation-wise on a drive shaft, a friction disc (14), carrying friction linings (15) at its external periphery, intended to be clamped rotation-wise on a driven shaft, a pressure plate (12), a cover (11) fixed on the reaction plate (13), axially-acting elastic means (16) acting between the cover (11) and the pressure plate (12), the pressure plate (12) being fixed rotation-wise to the cover (11) while being able to move axially with respect thereto, one of the reaction plate (13) and pressure plate (12) and cover (11), including two half-pieces, movable axially, with respect to one another, under the action of a play compensation device for compensating for the play due to wear, said play compensation device comprising at least one pair of circumferentially disposed complementary ramps (17, 18) associated axially respectively with each of the two half-pieces (12A, 12B), one of the ramps (17) being adapted to move circumferentially with respect to the other ramp (18) in a compensation direction of increasing the total thickness of said piece, and prevented from moving in the other direction by a unidirectional means (24, 124, 224), said circumferential movement being controlled by a trigger device (22) sensitive to the wear state, one of the ramps (18) being formed at the periphery of an inertia piece (12A), so that the irregular rotation speed of the motor vehicle heat engine is utilized in order to make the complementary ramps perform their relative circumferential movement in the play compensation direction, said clutch comprising control means adapted to control the play compensation device by selectively enabling its operation, said unidirectional means (24, 124, 224) being a split segment (24, 124, 224) fixed rotation-wise to said piece (12) and the control means, sensitive to acceleration, comprising a lever (30, 230) disposed radially overall, the end of which is between the ends of the split ring (24, 124, 224) and which is adapted to expand the split segment (24, 124, 224) wherein the lever (30, 230) is mounted able to rotate on said piece (12) so that it is held radially with regard to the centrifugal force.

2. Clutch according to claim 1, wherein said piece is one of the reaction plate (13) and pressure plate (12), referred to as the first plate, consisting of two half-plates, an external half-plate (12A) and an internal half-plate (12B), the internal half-plate (12B) being the one which faces a friction lining and which is intended to cooperate therewith, the two half-plates (12A, 12B) being fixed rotation-wise to the drive shaft but movable axially, with respect to one another, under the action of the play compensation device, one of the ramps (17), referred to as the support ramp, being fixed rotation-wise to one (12B) of the half plates, the other ramp (18), referred to as the adjustment ramp, being adapted to move circumferentially with respect to the support ramp (17) in the direction of increasing the total thickness of said first plate.

3. Clutch according to claim 2, wherein the support ramp (17) is carried by the internal half-plate (12B).

4. Clutch according to claim 3, wherein the axially-acting elastic means (16) comprises a diaphragm, and wherein the external half-plate (12A) is provided with a support bead (19) for the diaphragm.

5. Clutch according to claim 2, wherein the first plate is the pressure plate (12).

6. Clutch according claim 2, wherein the adjustment ramp (18) is carried by the external half-plate (12A).

7. Clutch according to claim 2, wherein the adjustment ramp (18) comprises a series of ramps extending circumferentially at the end of an annular piece (12A) made of cut and folded sheet metal constituting the external half-plate.

8. Clutch according to claim 1, wherein the lever (30, 230) comprises an active part (32, 232) disposed in line with the split in the split segment (124, 224).

9. Clutch according to claim 1, wherein the ends (33, 133, 233–34, 134, 234) of the split segment (24, 124, 224) which define its split have a radial extension.

10. Clutch according to claim 9, wherein the radial extension is obtained by tabs (33, 233–34, 234) added on to the ends of the segment (24, 224).

11. Clutch according to claim 9, wherein the radial extension is obtained by a looped conformation (133, 134) of the ends of the segment (124).

12. Clutch according to claim 9, wherein the segment (124) is made in a single piece.

13. Clutch according to claim 9, wherein the segment (124) is made from two seamed (138) pieces (131, 132).

14. Clutch according to claim 9, wherein the split segment (124) is held axially.

15. Clutch according to claim 14, wherein the split segment (124) is held axially by radial barbs (137), which it carries internally, received in an external groove or slot.

16. Clutch according to claim 1, wherein the split segment (24, 124, 224) is acted on elastically (35) circumferentially in one direction of rotation.

17. Clutch according to claim 1, wherein the rotation means is a spindle (31).

18. Clutch according to claim 1, wherein the rotation means is an articulation (231).

19. Clutch according to claim 18, wherein, for axially holding the lever (230), an active part (232) is received in radial slots (235, 236) formed at the ends of the segment (224).

* * * * *